(12) United States Patent
Mieger et al.

(10) Patent No.: US 7,464,967 B2
(45) Date of Patent: Dec. 16, 2008

(54) HYDRAULIC QUICK COUPLING

(75) Inventors: Rolf Mieger, Kirchdorf/Iller (DE); Thomas Zitterbart, Dietenheim (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 60 days.

(21) Appl. No.: 11/195,331

(22) Filed: Aug. 1, 2005

(65) Prior Publication Data

US 2006/0022455 A1    Feb. 2, 2006

(30) Foreign Application Priority Data

Aug. 2, 2004    (DE) ................. 10 2004 037 459

(51) Int. Cl.
*F16L 39/00*    (2006.01)

(52) U.S. Cl. .................. 285/124.5; 285/24; 285/27; 285/124.1; 285/920; 37/468; 414/723

(58) Field of Classification Search ............. 285/124.1, 285/124.2, 124.3, 124.5, 920, 24, 26–27, 285/29, 19; 37/468; 414/723; 29/434, 787, 29/890.14

See application file for complete search history.

(56) References Cited

U.S. PATENT DOCUMENTS

| | | | |
|---|---|---|---|
| 2,334,875 A | 11/1943 | Hufferd | |
| 4,738,463 A | 4/1988 | Poore et al. | |
| 5,465,513 A | 11/1995 | Sonerud | |
| 5,829,337 A | 11/1998 | Barden | |
| 6,196,595 B1 * | 3/2001 | Sonerud | .................. 285/26 |
| 2002/0157287 A1 | 10/2002 | Mieger et al. | |

FOREIGN PATENT DOCUMENTS

| | | |
|---|---|---|
| DE | 10159417 | 9/2002 |
| DE | 102 00 836 A 1 | 7/2003 |
| DE | 697 17 080 T 2 | 7/2003 |
| DE | 60102711 T | 3/2005 |
| EP | 0 202 798 A | 11/1986 |
| EP | 0434472 | 6/1991 |
| EP | 0 918 186 | 5/1999 |
| EP | 1317585 | 6/2003 |
| EP | 1365074 | 11/2003 |
| FR | 2687115 | 8/1993 |
| SE | 468320 | 12/1992 |
| WO | WO02/20906 | 3/2002 |
| WO | WO03/029567 | 4/2003 |

* cited by examiner

*Primary Examiner*—Aaron M Dunwoody
*Assistant Examiner*—Fannie Kee
(74) *Attorney, Agent, or Firm*—Alleman Hall McCoy Russell & Tuttle LLP

(57) ABSTRACT

A hydraulic quick coupling is described for the coupling of structural components. Two interacting quick-coupling parts are provided which are arranged respectively on the structural components, one quick-coupling part having at least one guide bolt which can engage in a centering bore of the quick-coupling part lying opposite it, each quick-coupling part being provided with coupling plugs or coupling sleeves for the connection of the hydraulic lines, and at least one quick-coupling part being arranged movably on one structural component in order to connect or separate the two quick-coupling parts.

12 Claims, 4 Drawing Sheets

US 7,464,967 B2

HYDRAULIC QUICK COUPLING

CROSS REFERENCE TO RELATED APPLICATION

This application claims priority to German Patent Application Serial No. DE 10 2004 037 459.7 filed Aug. 2, 2004, which is hereby incorporated by reference in its entirety for all purposes.

FIELD

The present application relates to a hydraulic quick coupling for the coupling of structural components of cranes, cargo-handling machinery, construction machinery, or the like, which are separated or reset, for example, for a specific use or for transport.

BACKGROUND AND SUMMARY

In cranes, cargo-handling machinery or construction machinery, such as excavators for example, hydraulic quick couplings are widely used for the purpose of coupling structural components which have to be separated or reset for a specific use of for transport.

The structural components are in most cases connected mechanically by quick-change systems, the coupling of the power transmission lines, especially those with large cross sections, being associated with considerable expenditure in terms of energy and in terms of time.

One object of the present application is to make available a hydraulic quick coupling which on the one hand reduces the expenditure of energy and time and on the other hand avoids contamination of the hydraulic fluid by using individual couplings free from leakage oil.

According to the one embodiment, the object is achieved by a hydraulic quick coupling. The coupling includes two interacting quick-coupling parts which are arranged respectively on the structural components that are to be connected or separated. One quick-coupling part has at least one guide bolt which can engage in a centering bore of the quick-coupling part lying opposite it, each quick-coupling part being provided with coupling plugs or coupling sleeves for the connection of the hydraulic lines, and at least one quick-coupling part being arranged movably on one structural component in order to connect or separate the two quick-coupling parts.

Preferred embodiments are set out in the dependent claims following on from the main claim. Accordingly, one quick-coupling part can preferably be arranged fixedly on one structural component, while the other quick-coupling part is arranged movably on the second structural component.

Particularly advantageously, at least one of the quick-coupling parts is spring-mounted in a support frame. In this way, the coupling can be kept free from forces acting on the structural components. The quick-coupling part spring-mounted in the support frame can, together with said support frame, be mounted movably on the structural component.

At least one lock can be provided via which the quick-coupling parts can be locked to one another in the coupled state. The lock can secure the at least one guide bolt driven into the corresponding at least one centering bore.

The movable quick-coupling part can sit displaceably on a linear guide. As has already been mentioned, the support frame in which the quick-coupling part is spring-mounted can also be guided on this linear guide. The movable quick-coupling part is advantageously displaceable via a piston/cylinder arrangement. To lock the quick-coupling parts in the coupled state, it is also possible for the coupled position to be fixed, for example, by a permanent pressure load of the piston/cylinder arrangement or by suitable shut-off valves.

Advantageously, the movable quick-coupling part spring-mounted in the support frame can be fixed in its opened position by a guide. The guide can comprise a guide means, for example, a guide bolt which engages in the coupling sleeve in the opened position of the quick-coupling part. In this position, the guide means, that is to say for example a guide bolt, permits guiding of the spring-mounted quick-coupling part in such a way that the forces acting on the latter can be taken up. When attaching the quick-coupling part, that is to say when moving it into the closed position, the quick-coupling part moves with its centering bore onto the guide bolt of the other quick-coupling part lying opposite it. In the coupled position, the guide means, that is to say for example the guide bolt, frees the corresponding coupling sleeve. The securing of the quick-coupling part is taken over by the guide bolt of the opposite quick-coupling part.

To provide a possibility of also being able to couple structural components which are angled about their bolted point, at least one of the two quick-coupling parts is arranged on a pivotable support bracket. The support bracket can be pivoted by its own piston/cylinder arrangement. The quick-coupling part arranged on the support bracket can in addition be driven along the support bracket and moved to and fro along the lengthwise guide with another piston/cylinder arrangement. In this way, the quick-coupling parts can also be coupled in an angled position.

DESCRIPTION OF THE DRAWINGS

Further features, details and advantages are explained in more detail on the basis of illustrative embodiments shown in the figures, in which.

DETAILED DESCRIPTION

Figure 1:
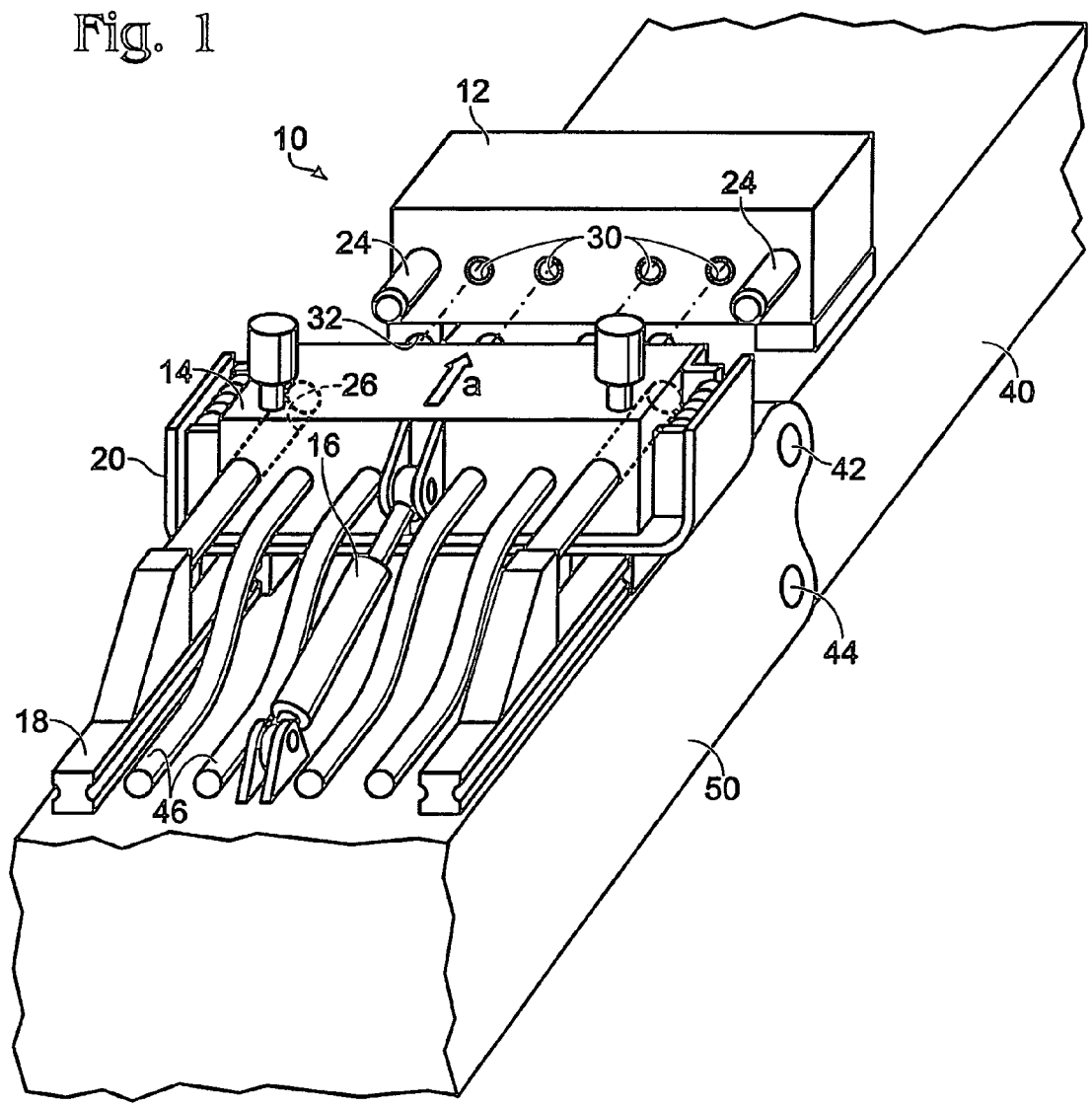
FIG. 1 shows a perspective view of a first embodiment variant of a hydraulic quick coupling.

Two structural components 40 and 50 of a hydraulic excavator are shown diagrammatically in FIG. 1, said structural components being connected to one another at two bolted points 42 and 44. A hydraulic quick coupling 10 is arranged on the structural components 40 and 50. Hydraulic lines 46 running on the respective structural components 40 and 50 are connected to one another via the hydraulic quick coupling 10. To simplify the figures, the hydraulic lines 46 are shown only on the structural component 50 and they run similarly on the structural component 40. A quick-coupling part 12 is arranged fixedly, for example welded or screwed, on the structural component 40. The quick-coupling part has lateral guide bolts 24. Coupling sleeves 30 are present at the center.

These coupling sleeves are connected (in a manner not shown) to corresponding hydraulic lines running on the structural component 40. A movable quick-coupling part 14 is arranged on the structural component 50. In the embodiment variant shown here, the quick-coupling part 14 is guided longitudinally displaceably on a linear guide 18 via a support frame 20 in which said quick-coupling part 14 is mounted. The linear displacement is effected via a piston/cylinder arrangement 16. By the piston/cylinder arrangement 16, the displaceable quick-coupling part 14 can thus be moved in an arrow direction toward the fixed quick-coupling part 12, so that the guide bolts 24 engage in centering bores 26 provided correspondingly in the movable quick-coupling part 14. In this way, the two quick-coupling parts are correctly oriented with respect to one another, so that corresponding coupling plugs 32, which are arranged on the movable quick-coupling part, can engage in the corresponding coupling sleeves 30 on the fixed quick-coupling part 12.

Figure 4:
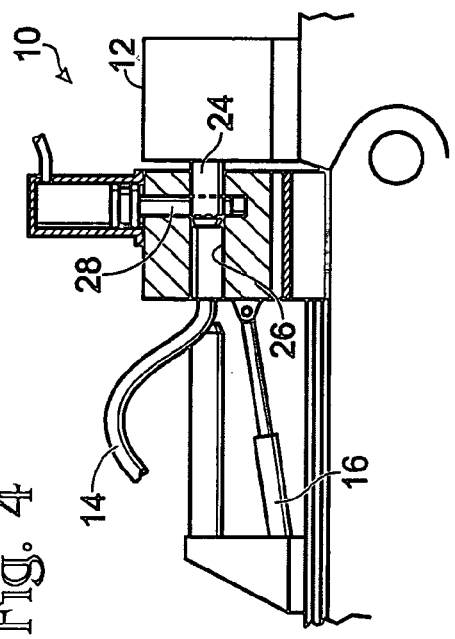
FIG. 4 shows a cross section along section line IV-IV in FIG. 3.
Figure 2:
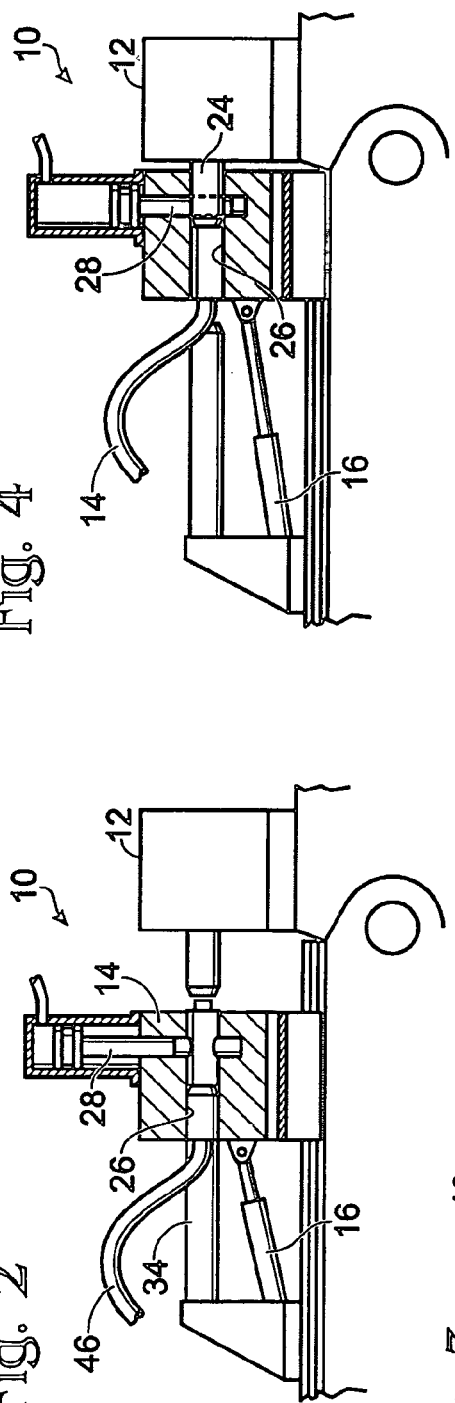
FIG. 2 shows a side view, in partial cross section, of the arrangement according to FIG. 1 in a first position.
Figure 3:
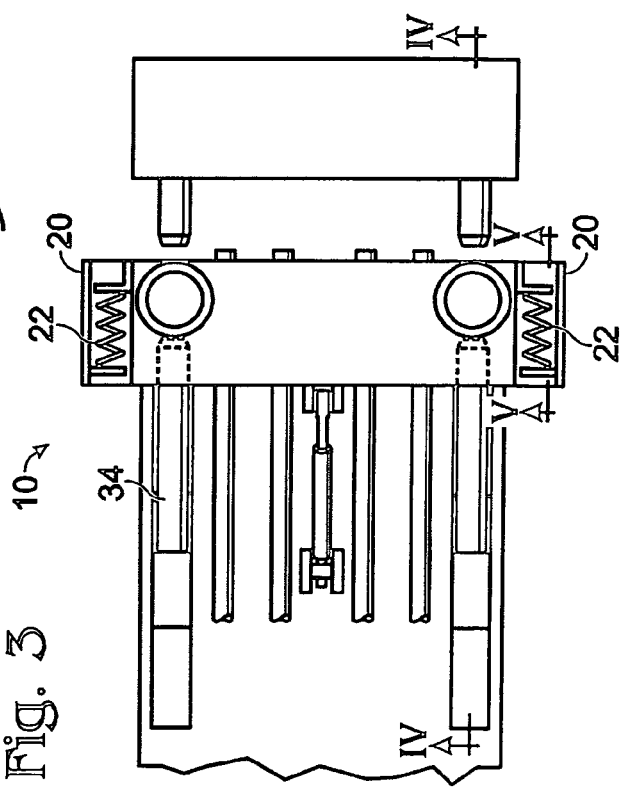
FIG. 3 shows a view according to FIG. 2 from above.

This situation is shown in particular in FIGS. 2 through 4. In FIG. 2, the movable quick-coupling part 14 is shown in the retracted position in which the piston/cylinder arrangement 16 is drawn.

In the plan view according to FIG. 3, the hydraulic quick coupling 10 is shown in the same position. By contrast, in FIG. 4, the hydraulic quick coupling is shown in the coupled state. This means that the movable quick-coupling part 14 has been moved by the piston/cylinder arrangement 16 in the direction to the fixed quick-coupling part 12, so that the guide bolts 24 engage in the corresponding centering bores 26. In the correspondingly coupled position, the hydraulic quick coupling 10 is secured by a locking bolt 28. The locking bolt 28 can be moved hydraulically in the manner shown here and passes through the guide bolt 24 via a corresponding hole (see FIG. 4).

Figure 5:
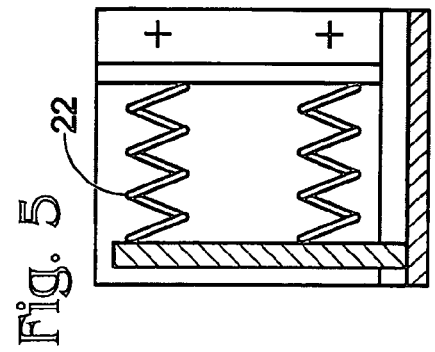
FIG. 5 shows a cross section along section line V-V in FIG. 3.

The movable quick-coupling part 14 is mounted in the support frame 20 via springs 22. FIG. 5 shows a corresponding section through the spring-mounting. It is thereby ensured that the quick-coupling parts can be connected to one another without becoming jammed at the time of coupling.

FIGS. 1 through 4 additionally show a guide, such as an example guide means 34 in the form of a guide bolt which engages in the centering bores 26 when the quick-coupling part 14 is in the retracted position. In this way, the movable quick-coupling part is also secured in its retracted position, as shown in FIGS. 1, 2 and 3, with the result that it is possible to compensate for the corresponding forces and torques which the hydraulic lines 46 exert on the spring-mounted quick-coupling part 14.

Figure 6:
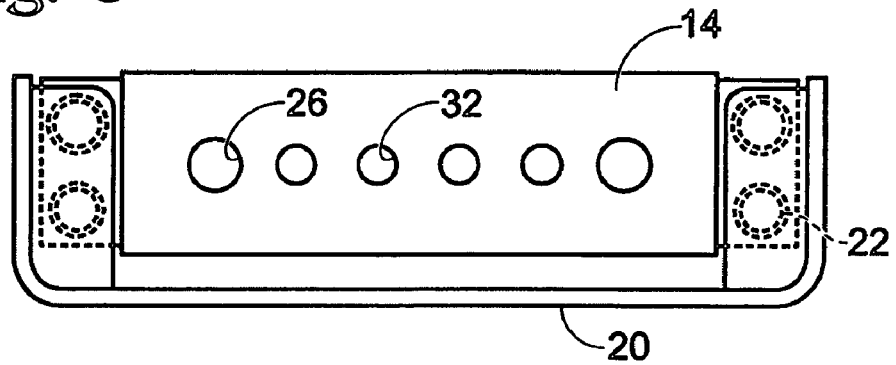
FIG. 6 shows a front view of the movable quick-coupling part in an embodiment according to FIGS. 1 through 5.
Figure 7:
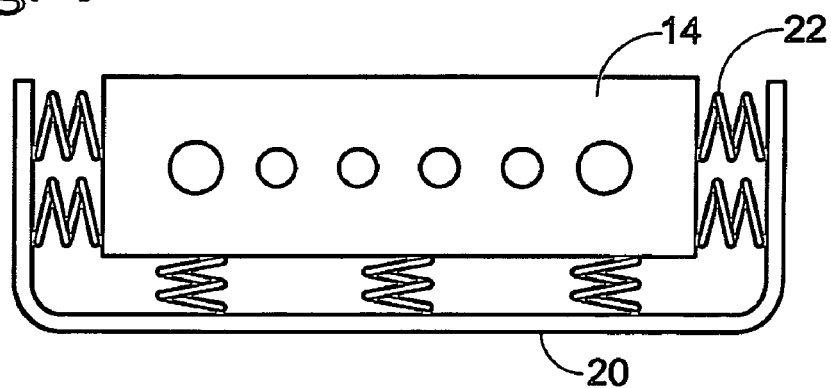
FIGS. 7 and 8 show other forms of spring suspension of the movable quick-coupling part.
Figure 8:
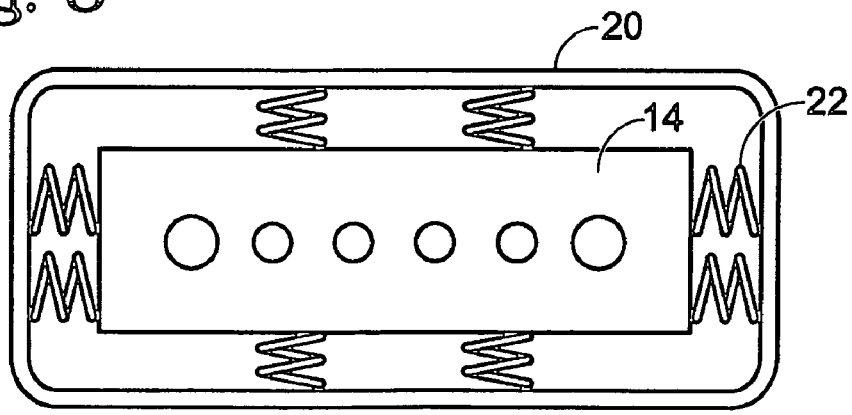

FIGS. 6, 7 and 8 show different forms of spring-mounting of the movable quick-coupling part 14 in the support frame 20. As can be seen from the individual figures, the support frames 20 here have different configurations and the springs 22 are arranged in different ways. These are of course only illustrative embodiments and they may be varied.

Figure 9:
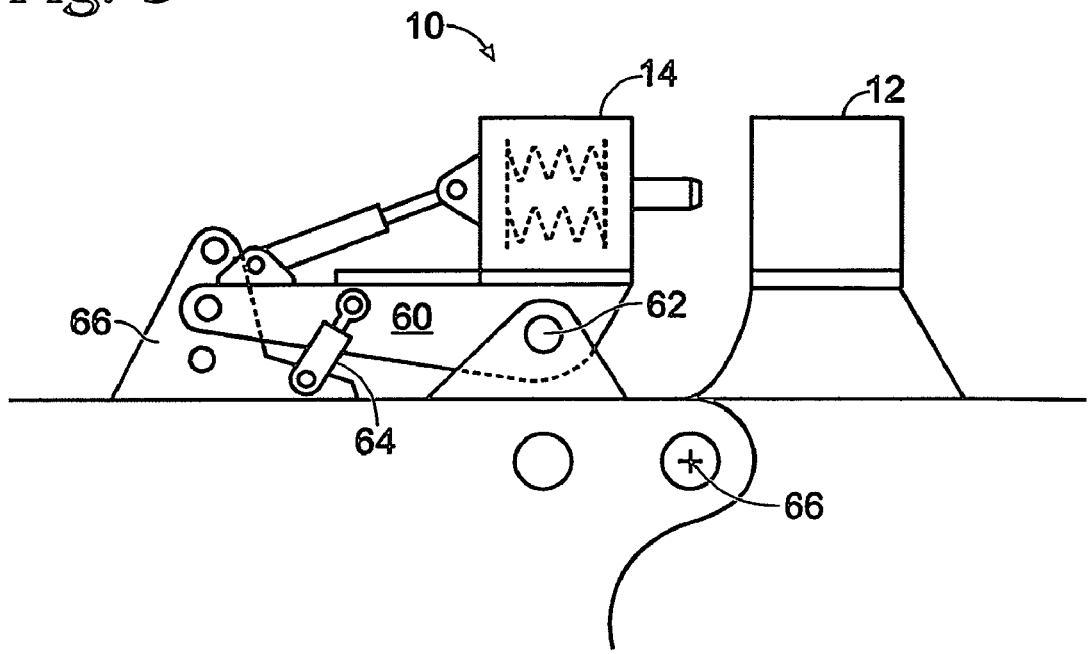
FIGS. 9 and 10 show a modified hydraulic quick coupling according to the present invention in two different positions.
Figure 10:
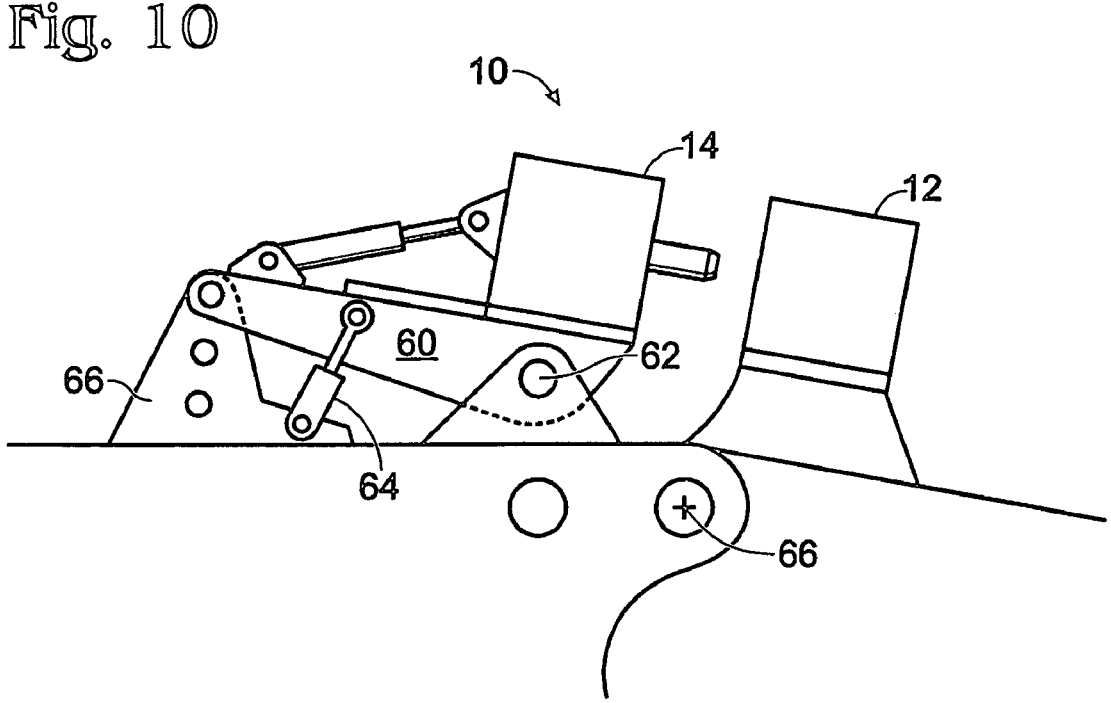

A modification of the hydraulic quick coupling 10 according to another embodiment is shown in FIGS. 9 and 10. Here, the movable quick-coupling part 14 is arranged displaceably on a support bracket 60. The support bracket 60 can be pivoted about a corresponding axis 62 by a piston/cylinder arrangement 64. To secure it, the support bracket 60 can also be bolted at the end position to a contact plate 66 which is arranged on the structural component 50. As will be seen from a comparison of FIGS. 9 and 10, this design of the hydraulic quick coupling 10 means that an angled structural component can also be attached. An angled structural component of this kind is shown in FIG. 10. Here, the structural component on which the fixed quick-coupling part 12 sits is angled about the bolt point 66 by a certain angle about which the movable quick-coupling part is likewise pivoted by the support bracket 60.

The invention claimed is:

1. A hydraulic quick coupling for the coupling of structural components of cranes, cargo-handling machinery or construction machinery, which are separated or reset, comprising:

two interacting quick-coupling parts which are arranged respectively on the structural components, one quick-coupling part having at least one guide bolt which is configured to engage in a centering bore of the quick-coupling part lying opposite it, each quick-coupling part being provided with coupling plugs or coupling sleeves for the connection of the hydraulic lines, and at least one quick-coupling part being arranged movably on one structural component in order to connect or separate the two quick-coupling parts, wherein the movable quick-coupling part sits displaceably on a guide, the guide coupling the movable quick-coupling part to the one structural component, wherein the movable quick-coupling part is displaceable along the guide via a piston/cylinder arrangement, and wherein the movable quick-coupling part moves along the guide even when the two interacting quick-coupling parts are fully disengaged, wherein at least one of the two quick-coupling parts is arranged on a pivotable support bracket, and wherein the support bracket can be pivoted by a piston/cylinder arrangement.

2. The hydraulic quick coupling as claimed in claim 1, wherein one quick-coupling part is arranged fixedly on one structural component, and the other quick-coupling part is arranged movably on the second structural component, where the other quick-coupling part is movable relative to the second structural component.

3. The hydraulic quick coupling as claimed in claim 1, wherein at least one of the quick-coupling parts is spring-mounted in a support frame.

4. The hydraulic quick coupling as claimed in claim 3, wherein the support frame is mounted movably on the structural component.

5. The hydraulic quick coupling as claimed in claim 3, wherein the movable quick-coupling part spring-mounted in the support frame is fixed in its opened position by a second guide bolt that engages the centering bore from an opposite side as the guide bolt.

6. The hydraulic quick coupling as claimed in claim 3, wherein a guide means fixes the movable quick-coupling part spring-mounted in the support frame in its open position.

7. The hydraulic quick coupling as claimed in claim 1, wherein at least one lock is provided which locks the quick-coupling parts to one another in the coupled state.

8. The hydraulic quick coupling as claimed in claim 7, wherein the lock secures the at least one guide bolt driven into the corresponding at least one centering bore.

9. The hydraulic quick coupling as claimed in claim 1, wherein the piston/cylinder arrangement is coupled between the movable quick-coupling part and the one structural component, and where the movable quick-coupling part moves along the guide even when the two interacting quick-coupling parts are fully disengaged.

10. The hydraulic quick coupling as claimed in claim 9, wherein the piston/cylinder arrangement is configured to move the movable quick-coupling part between a first, fully engaged position, and a second, fully retracted position.

11. The hydraulic quick coupling as claimed in claim 1 wherein said structural components are separated or reset for a specific use or for transport.

12. The hydraulic quick coupling as claimed in claim 1 wherein one quick-coupling part is movable relative to the structural component to which it is attached.

* * * * *